United States Patent
Akanuma et al.

(10) Patent No.: US 10,302,139 B2
(45) Date of Patent: May 28, 2019

(54) GREASE SEALING METHOD AND SEALING DEVICE FOR BALL BEARING AND BALL BEARING PRODUCED USING SAID SEALING METHOD

(71) Applicant: NSK LTD., Tokyo (JP)

(72) Inventors: Norihito Akanuma, Konan (JP); Hiroshi Araki, Fujisawa (JP)

(73) Assignee: NSK LTD., Tokyo (JP)

( * ) Notice: Subject to any disclaimer, the term of this patent is extended or adjusted under 35 U.S.C. 154(b) by 46 days.

(21) Appl. No.: 15/510,420

(22) PCT Filed: Sep. 11, 2015

(86) PCT No.: PCT/JP2015/075789
§ 371 (c)(1),
(2) Date: Jul. 5, 2017

(87) PCT Pub. No.: WO2016/039436
PCT Pub. Date: Mar. 17, 2016

(65) Prior Publication Data
US 2017/0314621 A1 Nov. 2, 2017

(30) Foreign Application Priority Data
Sep. 12, 2014 (JP) .................. 2014-186215

(51) Int. Cl.
*F16C 43/04* (2006.01)
*B23P 21/00* (2006.01)
(Continued)

(52) U.S. Cl.
CPC ............ *F16C 43/045* (2013.01); *B05C 1/027* (2013.01); *B05C 5/0212* (2013.01);
(Continued)

(58) Field of Classification Search
CPC ................ F16C 43/045; F16C 33/6622; F16C 33/6629; F16C 33/6625; F16C 19/06;
(Continued)

(56) References Cited

U.S. PATENT DOCUMENTS

2001/0023795 A1 9/2001 Sekine et al.
2014/0341490 A1 11/2014 Ito et al.

FOREIGN PATENT DOCUMENTS

CN 2622538 Y 6/2004
CN 101381933 A 3/2009
(Continued)

OTHER PUBLICATIONS

Machine Translation of Miyazaki, JP2007285516, Nov. 2007.*
(Continued)

*Primary Examiner* — Ryan J. Walters
(74) *Attorney, Agent, or Firm* — Sughrue Mion, PLLC

(57) ABSTRACT

A retainer is rotationally driven about a axis of a ball bearing, and convex areas having pockets provided therein along a ball pitch circle of the retainer and concave areas between adjacent pockets is detected by a sensor. Grease is discharged according to phases of the convex areas and concave areas in the rotationally driven retainer from a dispenser having grease discharge ports arranged to face an annular space.

8 Claims, 12 Drawing Sheets

(51) Int. Cl.
| | |
|---|---|
| *F16C 19/06* | (2006.01) |
| *B05C 1/02* | (2006.01) |
| *B05C 5/02* | (2006.01) |
| *F16C 33/66* | (2006.01) |
| *B05D 1/00* | (2006.01) |
| *B05D 1/26* | (2006.01) |
| *F16N 37/00* | (2006.01) |
| *B23P 15/00* | (2006.01) |
| *F16N 11/00* | (2006.01) |

(52) U.S. Cl.
CPC ............ *B05C 5/0216* (2013.01); *B05D 1/002* (2013.01); *B05D 1/26* (2013.01); *B23P 21/00* (2013.01); *F16C 19/06* (2013.01); *F16C 33/6622* (2013.01); *F16C 33/6625* (2013.01); *F16C 33/6629* (2013.01); *F16C 43/04* (2013.01); *F16N 37/003* (2013.01); *B23P 15/003* (2013.01); *F16N 11/00* (2013.01); *F16N 2210/14* (2013.01)

(58) Field of Classification Search
CPC .... F16C 43/04; F16N 37/003; F16N 2210/14; B05D 1/26; B05D 1/002; B05C 5/0216; B05C 5/0212; B05C 1/027; B23P 21/00
See application file for complete search history.

(56) References Cited

FOREIGN PATENT DOCUMENTS

| | | | |
|---|---|---|---|
| CN | 103797259 A | 5/2014 |
| JP | 2003-207095 A | 7/2003 |
| JP | 2003-232372 A | 8/2003 |
| JP | 2003-239998 A | 8/2003 |
| JP | 2003-329042 A | 11/2003 |
| JP | 2004-286061 A | 10/2004 |
| JP | 2006-258226 A | 9/2006 |
| JP | 2007-285516 A | 11/2007 |
| JP | 2008-151247 A | 7/2008 |
| JP | 2008-196886 A | 8/2008 |
| JP | 2008-202763 A | 9/2008 |
| JP | 2008-261797 A | 10/2008 |
| JP | 2008-267539 A | 11/2008 |

OTHER PUBLICATIONS

Communication dated Jul. 2, 2018, from the European Patent Office in counterpart European Application No. 15839284.5.
Office Action dated Oct. 24, 2017, issued by the Japanese Patent Office in counterpart Japanese Application No. 2014-186215.
Communication dated Oct. 12, 2018, issued by the State Intellectual Property Office of P.R. China in counterpart Chinese Application No. 201580061648.2.

* cited by examiner

GREASE SEALING METHOD AND SEALING DEVICE FOR BALL BEARING AND BALL BEARING PRODUCED USING SAID SEALING METHOD

TECHNICAL FIELD

The present invention relates to a grease sealing method and a grease sealing device for a ball bearing, and a ball bearing produced by the sealing method.

BACKGROUND ART

A ball bearing assembly process includes a grease sealing process of arranging a plurality of balls in an annular space between an outer ring and an inner ring and then supplying grease into the annular gap. In the grease sealing process, a predetermined amount of grease is supplied into the annular space. Generally, in the grease sealing process, a grease nozzle which discharges the grease pneumatically transported by a pump from small holes or slits arranged in a circular ring shape is widely used (for example, refer to Patent Documents 1 and 2).

FIGS. 10A and 10B show an example of a configuration of the grease nozzle. FIG. 10A is an outward perspective view of the grease nozzle and FIG. 10B is an axial sectional view of the grease nozzle. In a grease nozzle 500, a plurality of nozzle holes 502 corresponding to grease injection places of a ball bearing is arranged in a circular ring shape. When sealing the grease in the ball bearing by using the grease nozzle 500, each nozzle hole 502 of the grease nozzle 500 is first made to face an annular space between an inner ring and an outer ring of the ball bearing and then a pump (not shown) connected to the grease nozzle 500 is driven at that state. Thereby, the grease is discharged from each nozzle hole 502, so that the grease is filled in the annular space between the inner ring and the outer ring of the ball bearing, particular in areas between pockets of a retainer.

PRIOR ART DOCUMENTS

Patent Documents

Patent Document 1: JP-A-2003-207095
Patent Document 2: JP-A-2008-151247

SUMMARY OF THE INVENTION

Problem to be Solved by the Invention

However, the grease sealing method for the ball bearing of the conventional art has following problems.

(1) Threading of Grease

In the grease sealing method where the grease nozzle is used, when the grease has high viscosity, threading occurs upon separation of the grease nozzle from the ball bearing after the supply of the grease. When the grease of the threading part is attached to an end surface of the ball bearing, for example, since it is not appropriate to ship the ball bearing as it is, it is necessary to perform an operation of cleaning the attached grease in a post process.

FIGS. 11A to 11C show a manner of sealing the grease in the ball bearing by using the grease nozzle 500 and transporting the ball bearing to another place after the grease sealing. As shown in FIG. 11A, a ball bearing 1 is placed on a horizontal table (not shown), and the grease nozzle 500 is moved close to the ball bearing 1 from the above of the ball bearing 1 with the nozzle holes 502 facing downwards. In the ball bearing 1, a plurality of balls 4 are inserted in an annular space 7 between an outer ring 2 and an inner ring 3.

Subsequently, the grease G is pneumatically transported from a grease pump 501 connected to the grease nozzle 500 via a piping. Thereby, the grease is discharged from each nozzle hole 502 of the grease nozzle 500 towards the annular space 7 of the ball bearing 1.

After a predetermined amount of the grease G is supplied to the annular space 7, the grease nozzle 500 is retreated upwards, as shown in FIG. 11B. At this time, a so-called "threading" phenomenon that the grease G undergoes elongation in a thread shape from tip ends of the nozzle holes 502 of the grease nozzle 500 occurs. When the threading occurs, the grease G of the threading part may be attached to an end surface or the like of the ball bearing 1 upon conveyance of the ball bearing 1 to another place. When the grease of the threading part is attached to the ball bearing 1, it is necessary to newly perform an operation of cleaning the grease.

Therefore, in order to prevent the threading, the ball bearing 1 is rotatably driven to cut the grease GE of the threading part, for example. However, even though the ball bearing 1 is rotated, it is not possible to completely prevent the attachment of the grease, so that a satisfactory result is not obtained.

(2) Variation in Grease Discharging Amount

The grease nozzle 500 discharges the grease G filled in a circular ring-shaped internal space from the nozzle holes 502 provided in the circumferential direction. For this reason, the grease discharging amount may be varied due to a hole diameter error of each nozzle hole 502 formed by drilling processing or the like. When there occurs the variation in the grease discharging amount, there occurs a local variation in lubricating state of the ball and the bearing may be broken. Also, the variation in the grease discharging amount caused due to the processing error of the nozzle holes 502 cannot be corrected. For this reason, it is necessary to again produce the grease nozzle 500, which increases the production cost.

FIG. 12 shows a change of the variation in the grease discharging amount in accordance with the number of balls. As shown with a dotted line in FIG. 12, the variation in the discharging amount of the grease nozzle 500, which is used for the grease sealing device of the conventional art, increases as the number of balls increases.

(3) Responsiveness of Grease Discharging

In the grease sealing device of the conventional art, a piping length between the grease nozzle 500 and the grease pump 501 is large. In addition to this, an influence of the elasticity or the like of the piping itself is likely to be expressed. As a result, ON/OFF switching responsiveness of the discharging tends to decrease at the tip ends of the nozzle holes of the grease nozzle 500. For this reason, the grease sealing amount becomes unstable, so that a "grease sealing amount NG" state where the sealing amount becomes below or above a prescribed value frequently occurs.

(4) Grease Nozzle Dedicated to Bearing Number is Required

In the grease sealing device of the conventional art, the grease nozzle is produced to have a shape conforming to the retainer of the ball bearing, which is a grease supply target. For this reason, it is necessary to prepare in advance a grease nozzle suitable for each bearing number. In order to cope with many bearing numbers, it is necessary to prepare in advance a plurality of grease nozzles, which increases the production cost. Also, upon change of a setup, it is necessary to change the grease nozzle. Therefore, the variation in the grease sealing amount occurs depending on an operator's skill, so that it is necessary to adjust the variation.

FIG. 13 shows a change in cost of the sealing device in accordance with the number of balls. As shown with a dotted line in FIG. 13, the cost of the grease nozzle which is used in the grease sealing device of the conventional art increases as the number of balls increases.

The present invention has been made in view of the above circumstances, and an object thereof is to provide a grease sealing method and a grease sealing device for a ball bearing capable of preventing threading of grease when sealing grease into an annular space between an outer ring and an inner ring, reducing variation in a grease discharging amount and improving responsiveness of grease discharging and not requiring a device dedicated to each bearing, and a ball bearing produced by the grease sealing method.

Means for Solving Problems

The present invention is configured as follows.

(1) A grease sealing method for a ball bearing which includes an inner ring, an outer ring, a plurality of balls, and a retainer arranged in an annular space between the inner ring and the outer ring and accommodates the plurality of balls in pockets provided at intervals in a circumferential direction and for sealing grease in the annular space, the method comprising:

rotationally driving the retainer about an axis of the ball bearing;

detecting which one of convex areas where the pockets are provided along a ball pitch circle of the retainer or concave areas provided between the adjacent pockets, a detecting area is; and discharging grease from a dispenser including a grease discharge port arranged to face the annular space based on a detection result.

(2) The grease sealing method of (1), wherein an axial height of a side surface of the retainer which is rotationally driven is detected, and which area is determined based on the detected axial height.

(3) The grease sealing method of (1) or (2), wherein the retainer and the discharge port are moved relatively close to or separated from each other according to a timing of discharging the grease from the discharge port of the dispenser.

(4) The grease sealing method of (3), wherein the discharge port of the dispenser is moved closer to the concave area at a timing when the concave area of the retainer reaches a position facing the discharge port of the dispenser.

(5) The grease sealing method of (1) or (2), wherein the dispenser discharges the grease over an entire circumference of the retainer, and wherein a grease discharging amount from the dispenser is changed according to the areas.

(6) The grease sealing method of (5), wherein the grease discharging amount from the discharge port of the dispenser is made larger when the concave area of the retainer faces the discharge port than when the convex area of the retainer faces the discharge port.

(7) The grease sealing method of one of (1) to (6), wherein the grease is suctioned after discharging the grease.

(8) The grease sealing method of one of (1) to (7), wherein the ball bearing is a deep groove ball bearing having 13 or more balls.

(9) The grease sealing method of one of (1) to (7), wherein the ball bearing is a deep groove ball bearing having 20 or more balls.

(10) A grease sealing device for a ball bearing which includes an inner ring, an outer ring, a plurality of balls, and a retainer arranged in an annular space between the inner ring and the outer ring and accommodates the plurality of balls in pockets provided at intervals in a circumferential direction and for sealing grease in the annular space, the device comprising:

a rotation driving unit which rotationally drives the retainer about an axis of the ball bearing;

a sensor which detects which one of convex areas where the pockets are provided along a ball pitch circle of the retainer and concave areas provided between the adjacent pockets, a detection area is;

a dispenser which includes a grease discharge port arranged to face the annular space; and a control unit which discharges grease from the dispenser according to a detection signal from the sensor.

(11) The grease sealing device of (10), wherein the sensor includes a laser displacement meter which detects an axial height of a side surface of the retainer which is rotationally driven, along a circumferential direction.

(12) The grease sealing device of (10) or (11), further comprising:

a lifting driving unit which lifts up and down the dispenser to move the discharge port of the dispenser close to and away from the retainer.

(13) The grease sealing device of (10) or (11), further comprising:

a discharging amount adjusting unit which changes a grease discharging amount of the dispenser.

(14) The grease sealing device of one of (10) to (13), wherein the dispenser is capable of switching between a discharging operation of the grease and a suctioning operation of the grease.

(15) The grease sealing device of one of (10) to (14), wherein the dispenser includes a mono pump.

(16) The grease sealing device of one of (10) to (15), further comprising:

a radial driving unit which positions the dispenser in a radial direction of the ball bearing.

(17) A ball bearing produced by the method of one of (1) to (9).

Effects of the Invention

According to the grease sealing method and the grease sealing device for the ball bearing of the present invention, since the grease is discharged into the annular space between the outer ring and the inner ring of the ball bearing by using the dispenser, it is possible to discharge the grease to all the balls with the same condition and to accurately supply a constant amount of the grease to each ball. For this reason, it is possible to improve the grease sealing quality even for the bearing number of which the number of balls is large. Also, even when a kind of the ball bearing to be assembled is changed, it is possible to flexibly cope with each bearing number with one dispenser. Therefore, upon the change of the setup, it is not necessary to replace the device, and the variation in the grease sealing amount is not caused depending on the operator's skill. Therefore, the production process is simplified, so that it is possible to save the production cost of the ball bearing.

Also, the dispenser has a function (pump function) of generating a discharging pressure therein and discharge a predetermined amount of grease reserved in a syringe with high precision. For this reason, it is possible to improve the driving responsiveness upon start and stop of the discharging. Also, since a distance between a part from which the discharging pressure is to be generated and the discharge port is shorter, it is possible to produce the ball bearing in which the grease sealing amount is more correctly made.

Also, after discharging the grease by the dispenser, the grease is suctioned, so that it is possible to prevent the threading of the grease. For this reason, it is not necessary to perform the additional operation of cleaning the grease of the threading part in a post process, so that it is possible to produce the ball bearing of high grade at low cost.

Also, the ball bearing of the present invention becomes a product of high grade and high performance where the threading problem and the variation in the grease sealing amount are not caused.

DESCRIPTION OF EMBODIMENTS

Hereinafter, embodiments of the present invention will be described in detail with reference to the drawings.

<Configuration of Grease Sealing Device>

Figure 1:
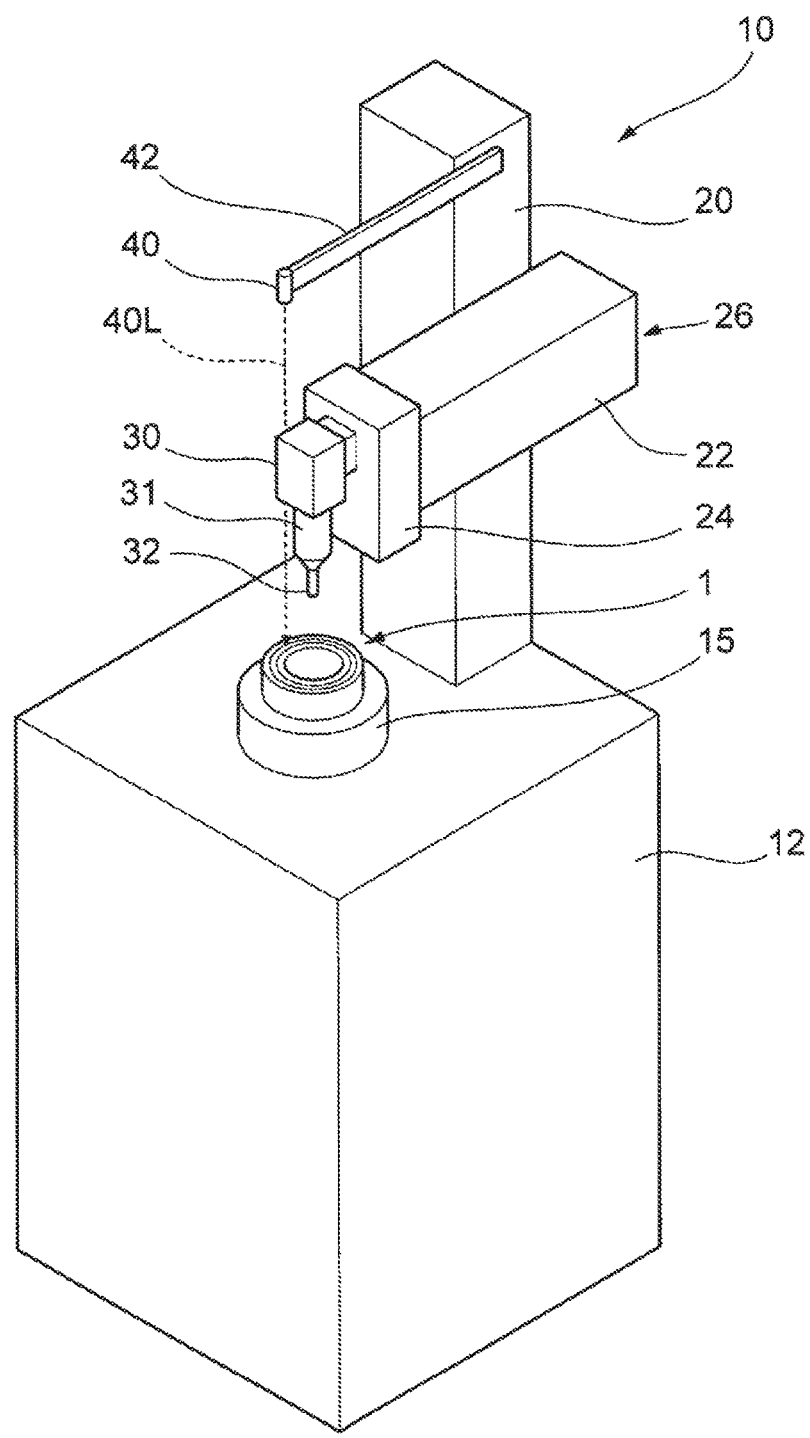
FIG. 1 is a perspective view of an overall configuration schematically showing a grease sealing device for a ball bearing according to an embodiment of the present invention.
Figure 2:
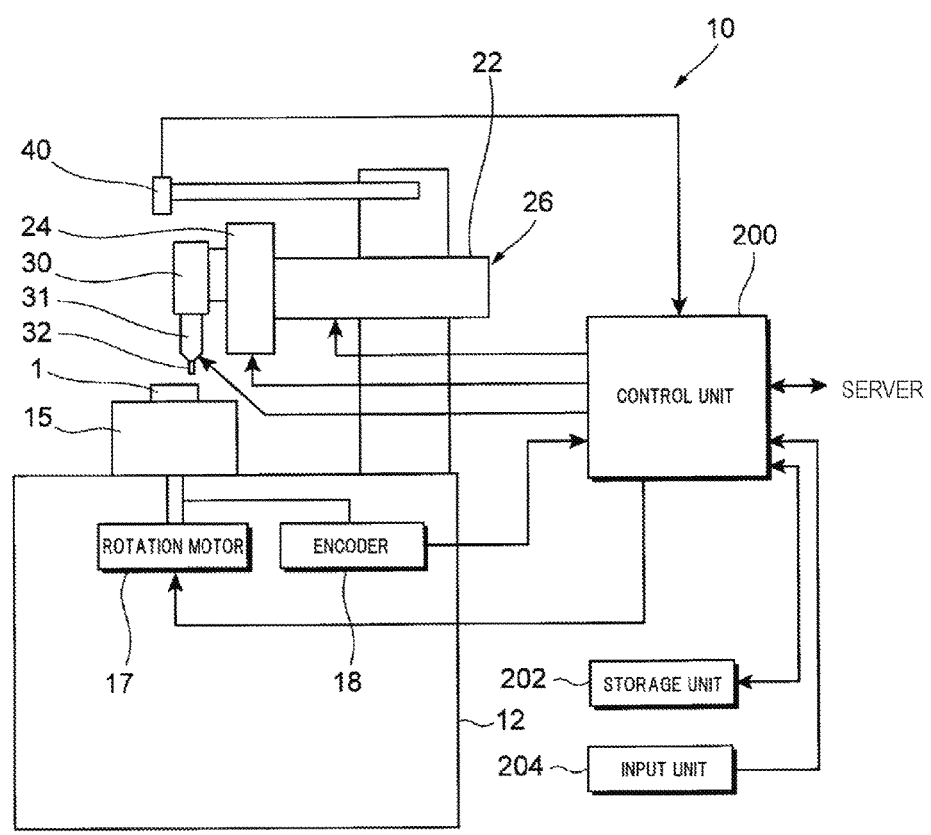
FIG. 2 is a control block diagram of the grease sealing device.
Figure 3:
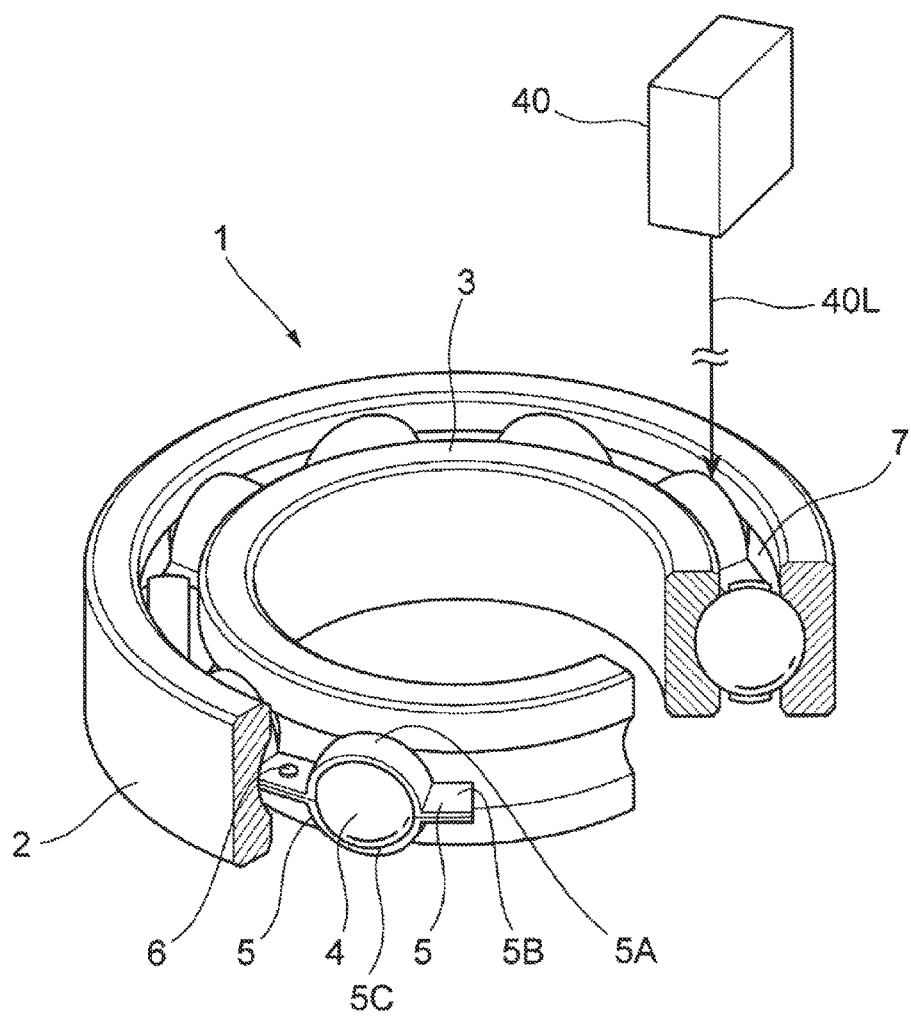
FIG. 3 is a partially sectional perspective view of the ball bearing.

FIG. 1 is a perspective view of an overall configuration schematically showing a grease sealing device for a ball bearing according to an embodiment of the present invention, and FIG. 2 is a control block diagram of the grease sealing device. FIG. 3 is a partially sectional perspective view of the ball bearing.

A grease sealing device 10 shown in FIGS. 1 and 2 seals grease in a gap space between an outer ring and an inner ring of a rolling bearing. As shown in FIG. 3, the rolling bearing, which is a workpiece, is a ball bearing 1 which includes an inner ring 3, an outer ring 2, a plurality of balls 4, and a retainer 5 arranged in an annular space between the inner ring 3 and the outer ring 2 and accommodates the plurality of balls 4 in pockets provided at intervals in a circumferential direction.

The grease sealing device 10 includes a standing frame 12 having a rotation frame 15, which is a part of a rotation driving unit, a dispenser 30 which discharges the grease towards the annular space, a laser sensor 40 which detects a specific area of the ball bearing 1, which is a grease sealing target, and a control unit 200 (refer to FIG. 2) which drives the respective units of the device.

The rotation frame 15 is rotationally driven about a substantially vertical axis by a motor 17, which is mounted in the standing frame 12 and a part of the rotation driving unit. As the motor 17, a servo motor, a stepping motor or the like can be used. A rotation angle position of the rotation frame 15 is accurately detected by an encoder 18.

An upper surface of the rotation frame 15 is a horizontal placement surface on which the ball bearing 1 (workpiece) is to be placed. The ball bearing 1 (workpiece) is set on the placement surface of the rotation frame 15 at a state where an axis of the bearing is matched with a rotation axis of the rotation frame 15.

The rotation frame 15 is provided with a workpiece holding device (not shown). The workpiece holding device includes a chuck which fixes the inner ring or outer ring of the ball bearing 1 to the rotation frame 15. In the meantime, the grease sealing device 10 may include a conveyance device (not shown) which carries the ball bearing 1 onto the rotation frame 15 and carries the ball bearing 1 from the rotation frame 15 to another place. Also, the ball bearing 1 may be manually carried on, fixed to and carried out of the rotation frame 15.

The standing frame 12 includes a support pillar 20 provided to vertically stand. The support pillar 20 supports a base end-side of a front-rear actuator 22. A lifting actuator 24, which is a lifting driving unit, is mounted to a tip end-side (an opposite side to the base end-side) of the front-rear actuator 22 such that it can freely move back and forth. The dispenser 30 is mounted on the lifting actuator 24 such that it can freely move up and down. Also, the laser sensor 40 is fixed to the support pillar 20.

The dispenser 30 is arranged to face the annular space between the outer ring and the inner ring of the ball bearing 1 and discharges a constant amount of grease towards the annular space. The dispenser 30 includes a mono pump 31. A lower end of the mono pump 31 is provided with a discharging nozzle 32, which is a grease discharge port.

The mono pump is a uniaxial eccentric screw pump of rotary displacement type, and a main part of the pump is configured by a combination of a rotor corresponding to a male screw and a stator corresponding to a female screw.

The mono pump has a configuration where the rotor is inserted in the stator to form a cavity in a gap between the stator and the rotor, and the rotor is rotated in the stator to move the cavity to a discharging-side while generating a strong suction force. Therefore, as the rotor is rotated, the fluid suctioned into the cavity is entirely continuously moved to the discharging-side in the sealed space and is then discharged to the outside. Since a sectional area of the cavity is always constant irrespective of a position of the rotor, a discharging amount of the fluid is always constant. For this reason, a fluid discharging amount per unit time is directly proportional to the rotating speed of the rotor and the non-pulsatile and constant amount transfer is implemented. Also, it is possible to reverse the flowing direction of the fluid simply by reversing the rotating direction of the rotor, so that it is possible to switch the discharging and the suctioning.

The front-rear actuator 22, which is a radial driving unit, moves the dispenser 30 in a radial direction of the rotation frame 15. Thereby, it is possible to position the discharging nozzle 32 of the dispenser 30 in the radial direction of the ball bearing 1 with respect to the ball bearing 1 set on the rotation frame 15.

The lifting actuator 24 lifts up and down the dispenser 30, thereby positioning the discharging nozzle 32 of the dispenser 30 in the vertical direction with respect to the ball bearing 1 set on the rotation frame 15. Thereby, it is possible to move the discharging nozzle 32 close to or away from the ball bearing 1.

The lifting actuator 24 and the front-rear actuator 22 may be configured using a combination of a servo motor and a gear mechanism, a hydraulic or pneumatic cylinder or the like.

It is possible to correctly position the discharging nozzle 32 of the dispenser 30 with respect to the ball bearing 1 by driving the lifting actuator 24 and the front-rear actuator 22 as a biaxial actuator 26.

The laser sensor 40 is a laser displacement meter which detects a height of a measurement target place by emitting a laser light 40L to the measurement target place and receiving a reflected light thereof.

The control unit 200 controls the overall driving operations of the respective units of the grease sealing device 10. Also, the control unit 200 functions as a discharging amount adjusting unit which changes a grease discharging amount of the dispenser 30. The control unit 200 is connected with a storage unit 202 in which a control program for executing a grease sealing sequence (which will be described later) is stored and an input unit 204 with which operation information such as a bearing number of the ball bearing and the like is input. Also, the control unit 200 is connected to a server (not shown) having a bearing database of a variety of specification information including a size of a bearing, the number of balls and the like set for each bearing number.

A server 210 provides the control unit 200 with information of a program number, which corresponds to a bearing number of the ball bearing which is a grease sealing target. The control unit 200 selectively executes a control program designated from a plurality of control programs prepared in advance in the storage unit 202, based on the information of the program number provided from the server 210. In the meantime, the control unit 200 may inquire the server 210 about a variety of specification information of the ball bearing and use the obtained information for execution of the control program, as necessary.

The control unit 200 outputs driving signals to the front-rear actuator 22, the lifting actuator 24, the dispenser 30, the motor 17 and the like, based on the control program corresponding to the kind of the ball bearing to be assembled. Thereby, a series of grease sealing operations of discharging the grease in accordance with rotation positions of the retainer of the ball bearing to be rotationally driven are executed. At this time, timings of the operations and the like are calculated and the respective units are driven based on a detection signal from the laser sensor 40 and a detection signal from the encoder 18 which detects the rotation positions of the rotation frame 15, The control unit 200 is a computer device (information processing device) including a CPU, a work memory and the like, such as a personal computer and a programmable controller, and the storage unit 202 is configured by a variety of recording media such as a hard disk drive, a memory and the like.

<Configuration of Retainer of Ball Bearing>

As shown in FIG. 3, the retainer 5 of the ball bearing 1 is formed by two circular ring-shaped members overlapping with each other in an axial direction and coupled to each other with rivets 6. A pocket for holding therein a ball 4 is defined between the rivets 6.

When the retainer 5 is seen from an outer side of the ball bearing 1 in the axis direction, a convex area 5A corresponding to a pocket position and a concave area 5B corresponding to a position between the pockets are alternately arranged with a predetermined pitch in a circumferential direction.

A height difference between the convex area 5A, in which the pocket 5C exists, and the concave area 5B, which is an area between the adjacent pockets 5C, is detected by the laser sensor 40 arranged at an outer side of the ball bearing 1 in the axis direction. From the information of the detected height difference, the convex area 5A and the concave area 5B can be distinguished.

In the meantime, the ball bearing 1 having the above configuration is a deep groove ball bearing having 13 or more balls or 20 or more balls. In the drawings to be described later, a deep groove ball bearing having 13 balls is exemplified.

<Relation Between Height Detection Position and Grease Discharging Position>

Figure 4:
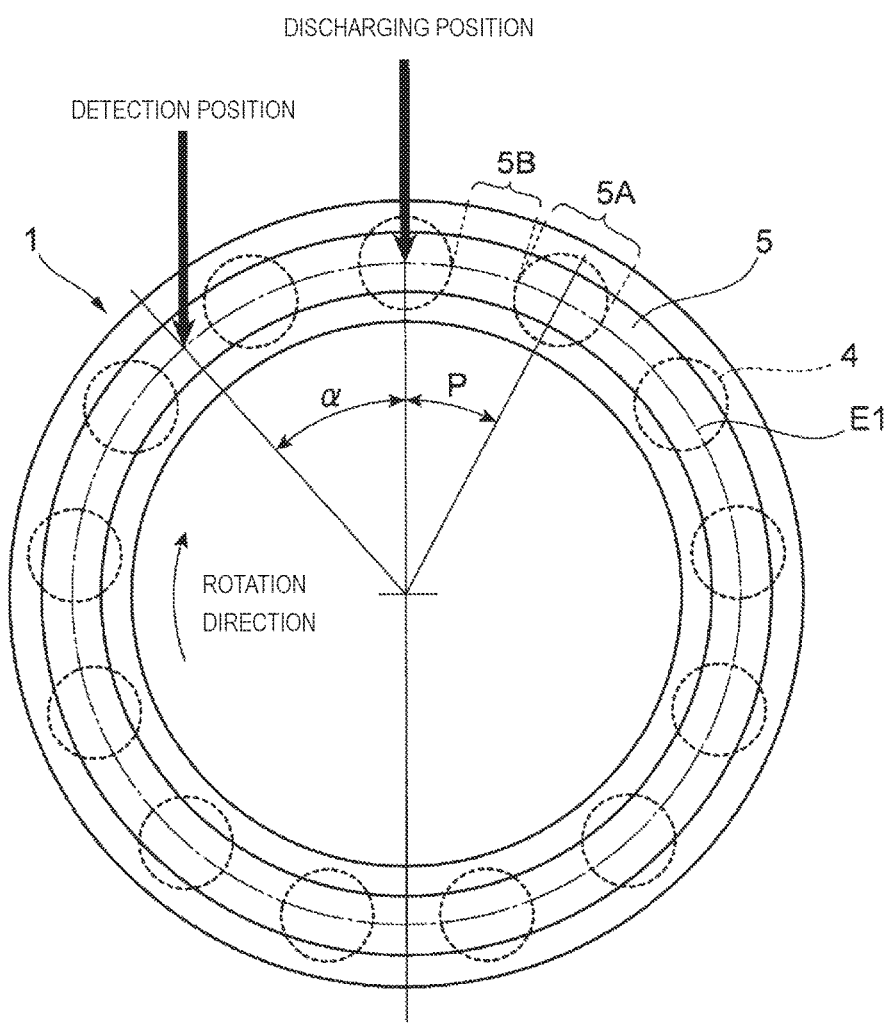
FIG. 4 is a plan view of the ball bearing, showing a relation between a detection position by a laser sensor and a grease discharging position by a dispenser.
Figure 5:
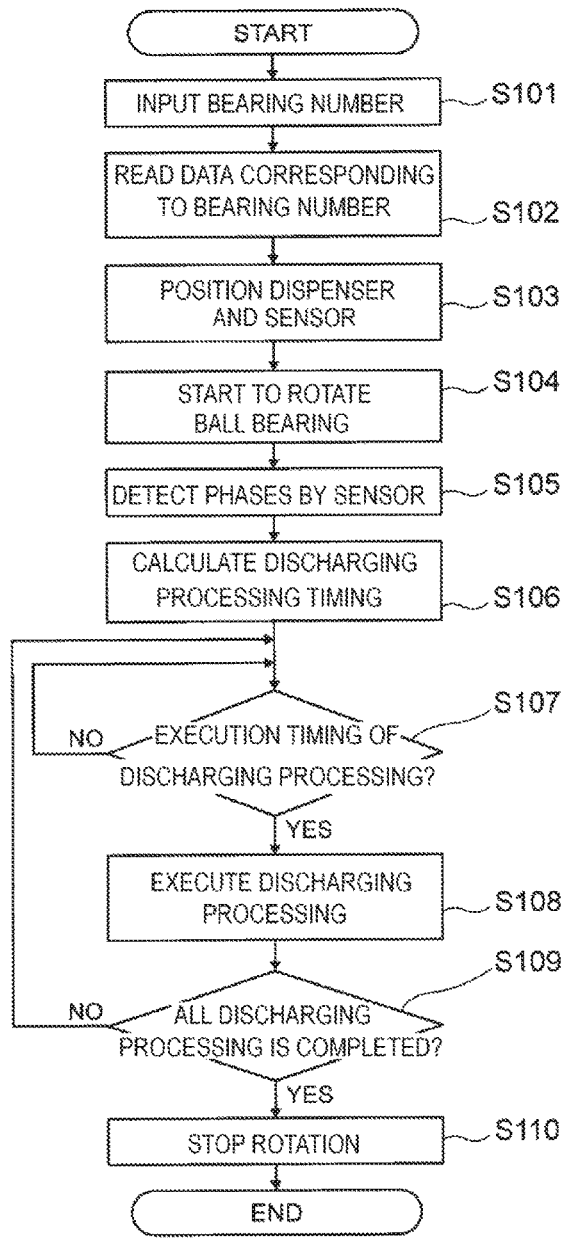
FIG. 5 is a flowchart showing a first grease sealing sequence which is to be performed by the grease sealing device for the ball bearing.

FIG. 4 is a plan view of the ball bearing, showing a relation between a detection position by the laser sensor and a grease discharging position by the dispenser. The laser sensor 40 detects the convex areas 5A, in which the pockets of the retainer 5 are provided, and the concave areas 5B between the adjacent pockets along a ball pitch circle E1 of the ball bearing 1.

As shown in FIG. 3, the laser sensor 40 measures an axial height of the retainer 5 which is rotationally driven on a predetermined position (detection position) above the ball pitch circle E1 of the retainer 5 by emitting the laser light 40L to a measurement target place and receiving a reflected light thereof.

The control unit 200 obtains the areas of the convex areas 5A and the concave areas 5B from height information obtained from the laser sensor 40 and rotation angle information obtained from the encoder 18. Also, the control unit 200 calculates a timing at which the concave area 5B of the retainer 5 is to pass the discharging position by the dispenser 30, in accordance with a circumferential position (hereinafter, referred to as 'phase') occupied by each of the obtained areas. Based on the passing timing, an operation timing of the dispenser 30 for grease sealing (which will be described later) is obtained by calculation.

In the meantime, the control unit 200 may calculate the operation timing of the dispenser 30 with a time axis by rotating the motor 17 at a constant speed and managing the height information from the laser sensor 40 on the time axis.

<First Grease Sealing Sequence>

Subsequently, a sequence of a first grease sealing method which is to be implemented by the grease sealing device 10 for the ball bearing is described with reference to a flowchart of FIG. 5 and FIGS. 6A to 6C.

First, as shown in FIGS. 1 to 3, the ball bearing 1 where the retainer 5 having the plurality of balls 4 accommodated therein is arranged in the annular space 7 between the outer ring 2 and the inner ring 3 is set on the rotation frame 15 at a state where the axis of the bearing is matched with the rotation axis of the rotation frame 15.

Before sealing the grease into the ball bearing 1, the information of the bearing number of the ball bearing 1 which is an operation target is input to the control unit 200. As the information of the bearing number, an identification number indicative of a bearing kind may be used. The information of the bearing number may be input from the input unit 204 by an operator or may be input from an external device such as a server.

The control unit 200 reads the input bearing number (S101) and reads data corresponding to the input bearing number from the storage unit 202 (S102). In this case, as the corresponding data, information such as a bearing kind, inner and outer diameters of the inner and outer rings, the number of balls, a ball pitch, a ball pitch circle diameter and the like, information such as a moving amount in the front-rear direction by the front-rear actuator 22 corresponding to the bearing, a lifting amount by the lifting actuator 24, the rotating speed of the rotation frame 15, and the like may be exemplified.

Then, the control unit 200 operates the front-rear actuator 22 to position the tip end (discharge port) of the discharging nozzle 32 of the dispenser 30 at a discharging position (above the grease discharging position) on the ball pitch circle E1 of the ball bearing 1 shown in FIG. 4. Also, the control unit 200 positions a phase detection position of the retainer 5 by the laser sensor 40 at a detection position on the ball pitch circle E1 of the ball bearing 1.

In the meantime, a positioning mechanism of the detection position by the laser sensor 40 is not shown. In this case, as the positioning mechanism, a configuration where an actuator such as the front-rear actuator 22 of the dispenser 30 is provided, a configuration where an inclination mechanism for adjusting an emission angle of the laser light to change the detection position is provided, and the like may be exemplified.

In any case, it is difficult to physically set the phase detection position by the laser sensor 40 at a position overlapping with the discharging position of the dispenser 30. For this reason, the phase detection position is set at a rotation position on the ball pitch circle E1 distant from the discharging position upward of the rotation direction of the retainer 5 by a predetermined central angle $\alpha$. For example, since a ball pitch angle P (when the number of the balls is n, P=360°/n) is already known, the phase detection position is preferably set at a position of an integral multiple of the ball pitch angle P. In this case, the phase of the retainer 5 at the detection position and the phase of the retainer 5 at the discharging position coincide with each other, i.e., the detection position and the discharging position are all within the convex area 5A or the concave area 5B, so that it is possible to easily control the driving of discharging the grease.

Also, even when the central angle $\alpha$ is an arbitrary value, since the ball pitch angle P is already known, it is possible to calculate the phase of the discharging position by a simple calculation, based on the phase of the phase detection position detected by the laser sensor 40 and the encoder 18.

The control unit 200 positions the tip end of the discharging nozzle 32 of the dispenser 30 at a predetermined discharging position (S103). When the control unit 200 positions the phase detection position by the laser sensor 40 at a predetermined position, the control unit 200 outputs the driving signal to the motor 17 to continuously rotate the rotation frame 15 at a constant speed (S104). Thereby, the ball bearing 1 set on the rotation frame 15 rotates about the axis of the bearing, together with the retainer 5. Then, the control unit 200 reads the detection values of the laser sensor 40 to detect the phases of the convex areas 5A and the concave areas 5B of the retainer 5 while rotating the ball bearing 1 (S105).

A detection result of the phases of the retainer 5 may be represented with being replaced with the rotation angle positions of the rotation frame 15. For example, when the ball pitch angle is denoted as P, whenever the rotation angle position of the rotation frame 15 changes by P, the phase of the retainer 5 coincides at the discharging position of the dispenser 30. Therefore, when the pair of the convex area 5A and the concave area 5B is once detected by the laser sensor 40, it is possible to calculate whether the current discharging position is within the convex area 5A or the concave area 5B simply by detecting the rotation angle position of the rotation frame 15 from the encoder 18.

The control unit 200 calculates a series of timings of discharging processing, based on the detection data from the laser sensor 40 and the encoder 18 (S106). The series of timings of discharging processing include timings of lowering start and lowering stop of the dispenser 30 by the lifting actuator 24, timings of grease discharging start and stop of the dispenser 30, timings of start and stop of the suctioning operation of the dispenser 30, timings of lifting start and lifting stop of the dispenser 30 by the lifting actuator 24, and the like. The respective timings are calculated based on the detection data of the respective areas of the convex areas 5A and the concave areas 5B of the retainer 5, in association with the rotation angle positions of the retainer 5.

Subsequently, the control unit 200 stands by until a timing at which the dispenser 30 is to execute the discharging processing, based on the detection data from the encoder 18 (S107). That is, the control unit 200 stands by until the concave area 5B of the retainer 5 reaches the discharging position of the dispenser 30 as the rotation frame 15 rotates. When the concave area 5B reaches the discharging position, the control unit 200 executes a series of the discharging processing (S108). The series of discharging processing includes lowering of the dispenser 30, discharging of the grease, suctioning of the grease and lifting of the dispenser 30.

The specific operation sequences of the series of discharging processing are described with reference to FIGS. 6A to 6C.

Figure 6A:
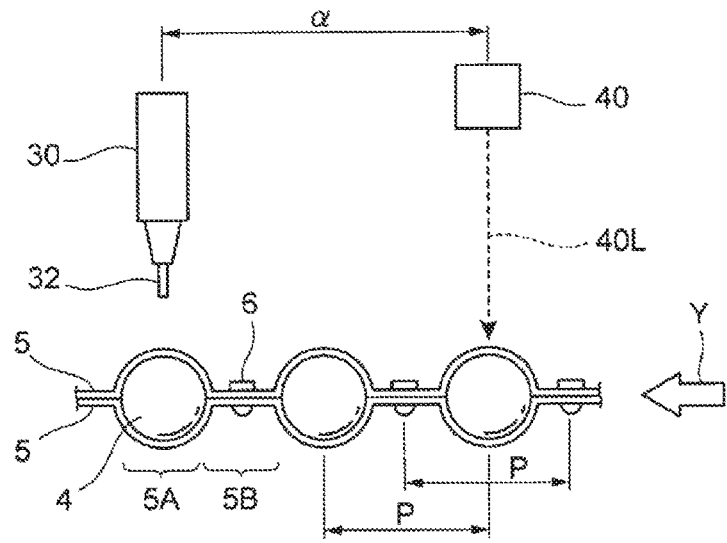
FIGS. 6A, 6B and 6C show operations of the first grease sealing sequence in each step.

As shown in FIG. 6A, the retainer 5 in which concave areas 5B are arranged at intervals of the ball pitch angle P rotates in an arrow Y direction at a constant speed. Meanwhile, in FIGS. 6A to 6C, a horizontal direction indicates a circumferential direction of the ball pitch circle. The control unit 200 controls the laser sensor 40 to detect a surface height of the retainer 5 at the phase detection position distant from the discharging position of the dispenser 30 by a circumferential distance corresponding to the predetermined central angle $\alpha$.

The control unit 200 calculates the timing at which the concave area 5B of the retainer 5 reaches the discharging position of the dispenser 30, based on the detection data from the laser sensor 40 and the detection data of the rotation angle position from the encoder (not shown). At a point of time when the discharging position of the dispenser 30 reaches the concave area 5B of the retainer 5, the control unit 200 drives the lifting actuator 24 to lower the dispenser 30 located at a retreat position above the ball bearing 1. Then, as shown in FIG. 6B, the control unit 200 moves the tip end of the discharging nozzle 32 of the dispenser 30 toward the concave area 5B of the retainer 5 as close as possible.

After bringing the tip end of the discharging nozzle 32 close to the concave area 5B, the control unit 200 starts to discharge the grease G by the dispenser 30. The control unit 200 drives the mono pump of the dispenser 30 to discharge a predetermined amount of the grease G to the concave area 5B. After discharging the predetermined amount of the grease G, the control unit 200 reversely rotates the rotor of the mono pump, thereby performing a suctioning operation in a predetermined short time. The suctioning operation is a thread cutting operation of suctioning the grease G from the discharging nozzle 32 to cut the threading of the grease G.

Figure 6B:
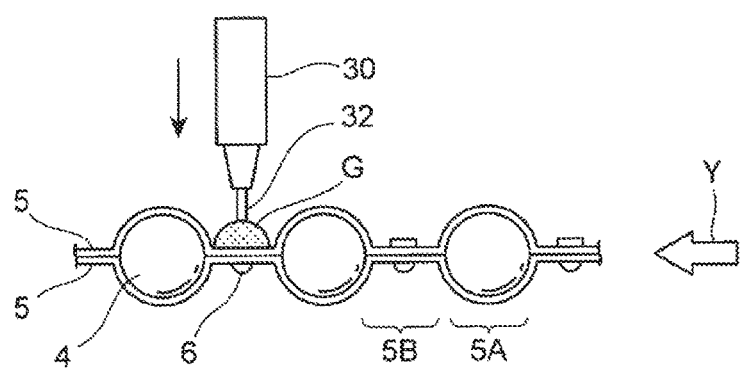
Figure 6C:
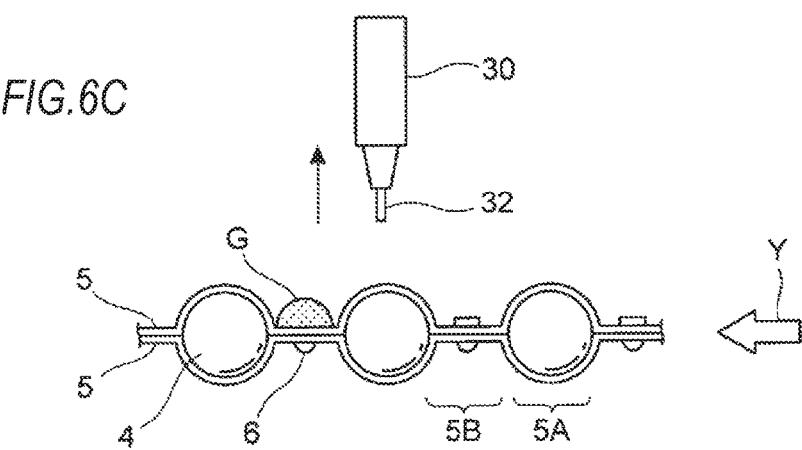

After performing the suctioning operation, the control unit 200 lifts up the dispenser 30 to a predetermined retreat position and moves the tip end of the discharging nozzle 32 away from the concave area 5B, as shown in FIG. 6C. During the series of operations, the retainer 5 of the ball bearing 1 continues to rotate in the arrow Y direction at the constant speed.

Meanwhile, in the above descriptions, after the lowering of the dispenser 30 is stopped, the grease is discharged, and after the suctioning operation is over, the dispenser 30 is lifted up. However, the grease sealing sequence is not limited thereto. For example, the grease G may be discharged during the lowering of the dispenser 30 and the dispenser 30 may be lifted up during the discharging of the grease G. Also, during the lifting up of the dispenser 30, the suctioning operation may be performed. Thereby, the takt time is reduced.

The operations of FIGS. 6A to 6C are performed at a state where the ball bearing 1 including the retainer 5 is rotating at the constant speed. The discharging processing for one concave area 5B is completed through the processing of steps S107 and S108. The control unit 200 repeatedly performs the discharging processing for the concave area 5B (S109), and when the discharging processing for all the concave areas 5B of the ball bearing 1 is completed, the control unit 200 stops the rotation of the rotation frame 15 (S110). Also, the control unit 200 retreats the dispenser 30 more upwards and carries the ball bearing 1 to another place. Thereby, the grease sealing processing for one ball bearing 1 is over.

<Operational Effects by First Grease Sealing Sequence>

In the first grease sealing sequence, the grease G is supplied to the annular space 7 between the outer ring 2 and the inner ring 3 of the ball bearing 1 with the same condition by the same dispenser 30. For this reason, it is possible to equally supply the grease to the concave areas 5B of the retainer 5, so that it is possible to prevent the variation in the discharging in the circumferential direction. Also, the dispenser 30 which is used in the present configuration has a pump function of generating a discharging pressure therein. For this reason, it is possible to accurately discharge a constant amount of the grease reserved in a syringe having a discharge port at a tip end portion with high responsiveness, without a long piping.

Further, the suctioning operation is performed after the grease discharging operation, so that it is possible to remove the threading of the grease. Therefore, it is not necessary to perform an additional operation of cleaning the grease of which the threading part is attached to the ball bearing, in a post process, for example. Also, it is possible to seal the grease into the ball bearing with a correct supply amount of the grease, so that it is possible to prevent the variation in the grease sealing amount. Also, the mono pump is used, so that it is possible to simply switch between positive and negative pressures of the discharging pressure and to simply perform the grease suctioning operation without newly adding a piping path.

Figure 10A:
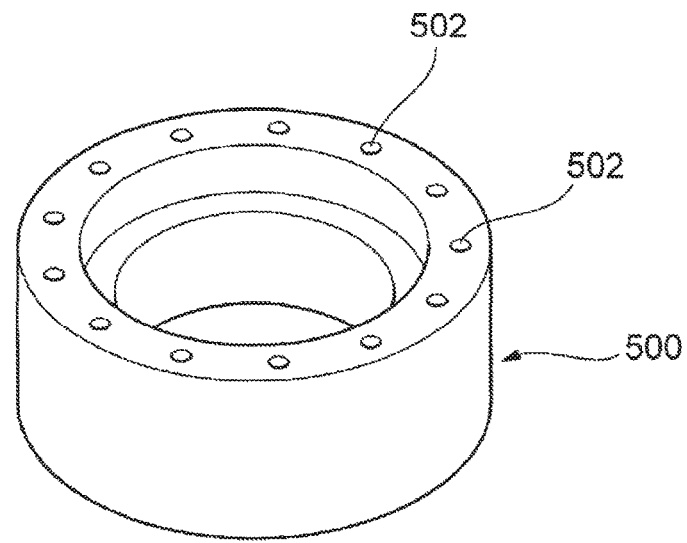
FIG. 10A is an outward perspective view of a grease nozzle of the conventional art.
Figure 10B:
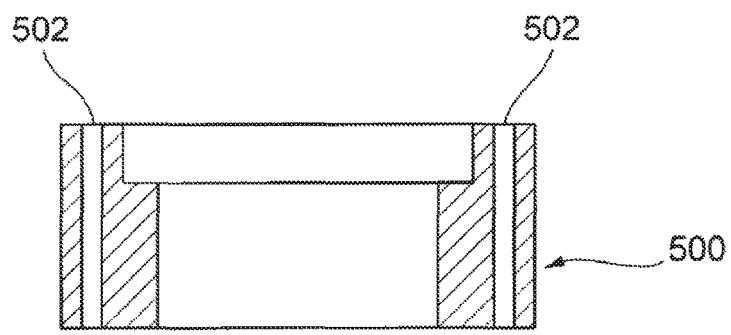
FIG. 10B is an axially sectional view of the grease nozzle.
Figure 11A:
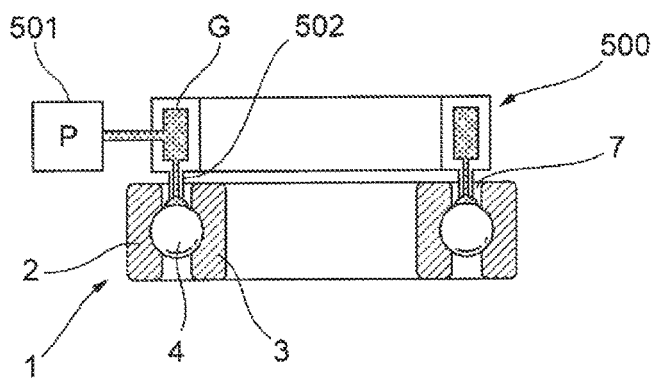
FIGS. 11A to 11C show a manner of sealing grease in a ball bearing by using the grease nozzle of the conventional art and then transporting the ball bearing to another place after the grease sealing.
Figure 11B:
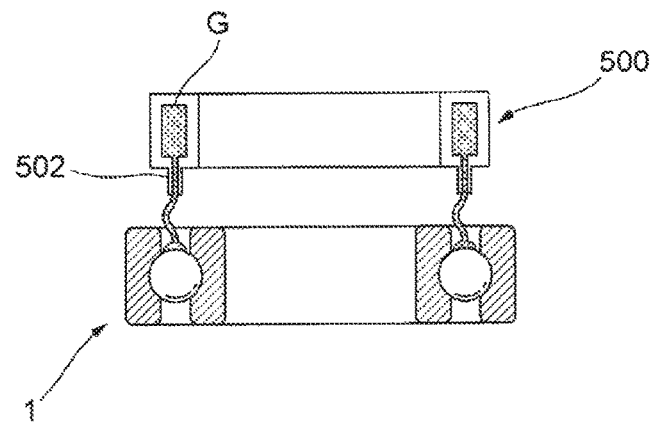
Figure 11C:
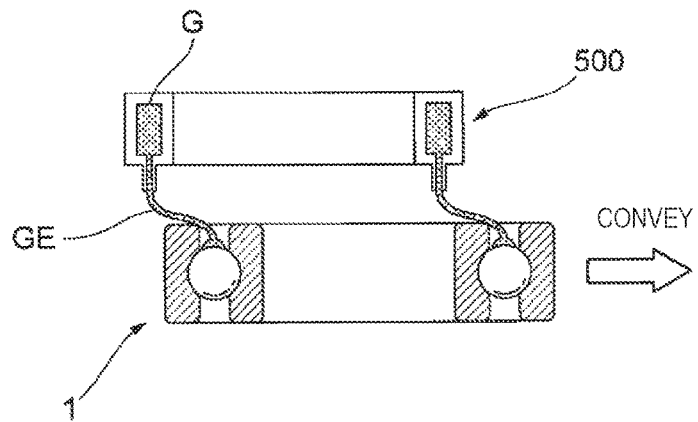
Figure 12:
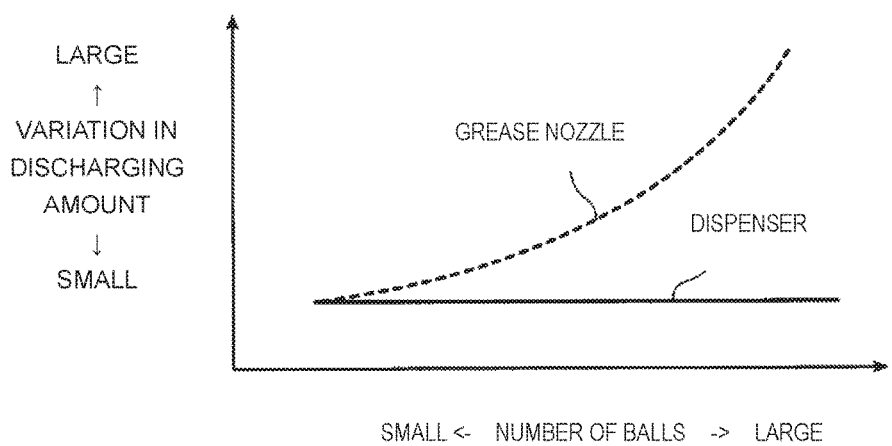
FIG. 12 is a graph showing changes of variation in discharging amount in accordance with the number of balls, in the grease nozzle of the conventional art and the dispenser of the present configuration.

A solid line of FIG. 12 indicates changes of a variation degree in the grease discharging amount of the present configuration in accordance with the number of balls. The variation in the discharging amount by the grease nozzle 500 shown in FIGS. 10A and 10B tends to increase as the number of balls of the ball bearing increases (a dotted line in FIG. 12). However, according to the method of using the dispenser 30 having the present configuration, the variation degree in the grease discharging amount tends to be constant irrespective of the number of balls.

Also, according to the discharging method by the present configuration, the grease is supplied to the annular space 7 between the outer ring 2 and the inner ring 3 while rotating the retainer 5. For this reason, it is possible to equally supply a necessary amount of the grease to each concave area 5B of the ball bearing 1 by the simple driving control, so that it is possible to reduce the variation in the grease sealing amount in the circumferential direction of the annular space 7. Therefore, it is possible to improve the grease sealing quality even for a bearing number of which the number of balls is large.

Also, even when the kind of the ball bearing 1 to be assembled is changed, it is possible to flexibly perform the adjustment operation of the grease discharging position, the phase detection position and the like for each bearing number, so that it is not necessary to perform a troublesome operation such as replacement and adjustment of jigs. For this reason, the variation in the grease sealing amount, which is caused depending on an operator's skill, does not occur and the ball bearing of high grade can be assembled at low cost.

Figure 13:
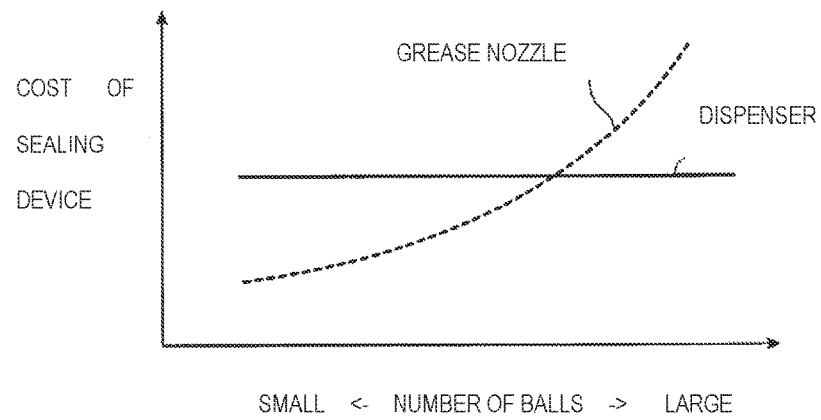
FIG. 13 is a graph showing changes of costs of a sealing device in accordance with the number of balls, in the grease nozzle of the conventional art and the dispenser of the present configuration.

A solid line of FIG. 13 indicates changes of cost of the dispenser method of the present configuration in accordance with the number of balls. The cost of the grease nozzle 500 shown in FIGS. 10A and 10B tends to increase as the number of balls of the ball bearing increases (a dotted line in FIG. 13). However, according to the method of using the dispenser 30 of the present configuration, it is possible to keep the cost constant irrespective of the number of balls. That is, since the cost of the dispenser method does not relate to the number of balls, it is possible to assemble a ball bearing having a bearing number of which the number of balls is larger, at lower cost.

Also, cleaning oil or rust-proofing oil may be attached to a surface of the retainer 5. At this state, the grease is likely to flow down from the surface of the retainer 5. Even under this condition, the grease is discharged with the tip end of the discharging nozzle 32 which is moved close to the retainer 5, so that the grease securely stays on the surface of the retainer 5.

In the above configuration, since only the discharging of the grease is intermittently performed while continuously rotating the ball bearing 1, it is possible to shorten the cycle time of the grease sealing.

In the above configuration, when detecting the phase of the retainer 5, the surface height of the retainer 5 is measured in a non-contact manner by the laser sensor 40. For this reason, it is possible to correctly detect each area of the convex areas 5A and the concave areas 5B without damaging the ball bearing 1. Also, the phase may be detected by a camera mounted above the rotation frame 15, instead of the laser sensor 40. In this case, the retainer 5 and the ball bearing 1 being rotated are captured by the camera and the captured image is image-processed to calculate the positions of the balls, so that the phases of the convex areas 5A and the concave areas 5B of the retainer 5 are detected.

<Second Grease Sealing Sequence>

Subsequently, a sequence of a second grease sealing method is described.

Depending on the bearing number of the grease, the grease sealing amount may be larger than the other. In this case, the dispenser 30 is kept at a constant height with respect to the ball bearing 1 without lifting up and down the dispenser 30 in accordance with the phases of the convex areas 5A and the concave areas 5B. Then, the grease is continuously discharged into the annular space 7 between the outer ring 2 and the inner ring 3 of the ball bearing 1 being rotated.

Figure 7:
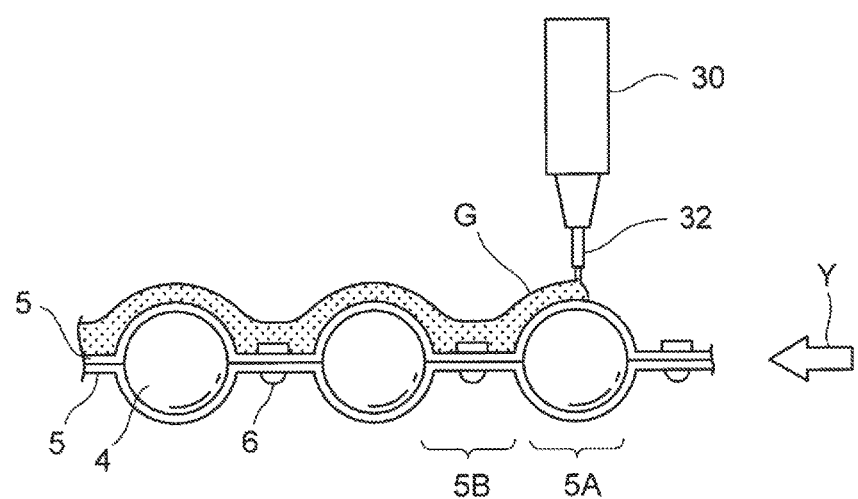
FIG. 7 is a reference view showing a manner of grease when the grease is continuously supplied at a constant discharging speed irrespective of a change in phases of convex areas and concave areas of a retainer.

However, as shown in FIG. 7, when the grease is continuously supplied at the constant discharging speed, irrespective of the change in the phases of the convex areas 5A and the concave areas 5B of the retainer 5, a surface of the grease G becomes uneven in conformity to the unevenness of the convex areas 5A and the concave areas 5B. Therefore, there are concerns that the grease is to be attached to a backside of a seal or shield of the bearing, the grease is to stick out to the outside of the bearing when pressing the seal or shield into an attachment groove, and the like.

In order to solve the concerns, in this configuration example, the discharging speed of the grease to be discharged to the convex area 5A and the discharging speed of the grease to be discharged to the concave area 5B are made to be different. That is, the grease discharging amount is set larger in the concave area 5B and the grease discharging amount is set smaller in the convex area 5A. Thereby, the surface of the grease discharged to the retainer 5 is smoothed.

In the below, the second grease sealing sequence in which the discharging speed of the grease is changed is described with reference to FIGS. 8A to 8C. In the second grease sealing sequence, the control unit 200 positions the tip end of the discharging nozzle 32 of the dispenser 30 at a predetermined height above the ball pitch circle of the retainer 5. The control unit 200 changes the discharging speed (the discharging amount) of the grease from the positioned discharging nozzle 32 in accordance with the phases of the convex areas 5A and the concave areas 5B of the retainer 5.

Figure 8A:
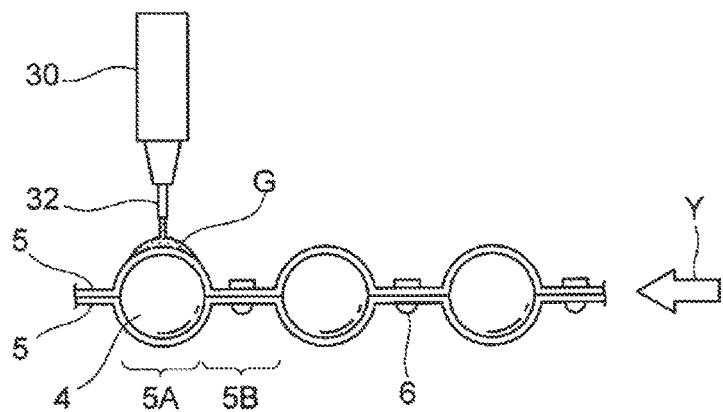
FIGS. 8A, 8B and 8C show operations of a second grease sealing sequence in each step.
Figure 8B:
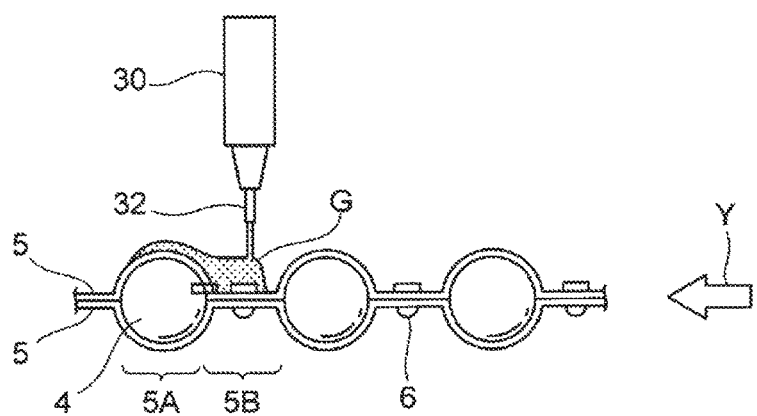
Figure 8C:
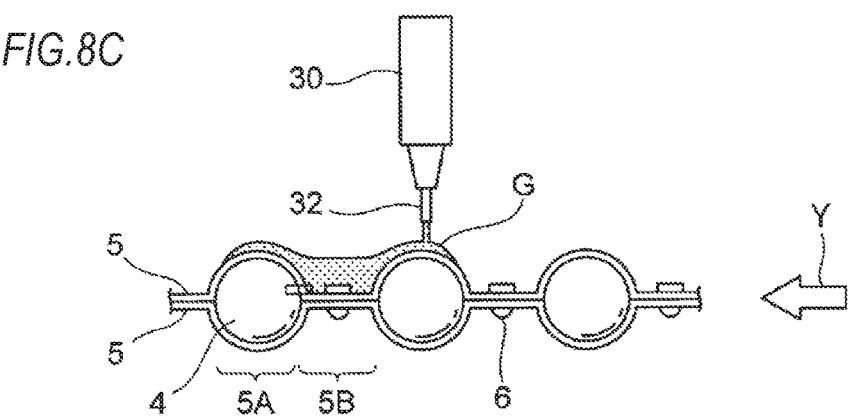

That is, as shown in FIGS. 8A and 8C, when the convex area 5A of the retainer 5 being rotationally driven reaches the discharging position on the ball pitch circle E1 of the retainer 5 facing the tip end of the discharging nozzle 32, the control unit 200 discharges the grease G less from the dispenser 30. As shown in FIG. 8B, when the concave area 5B reaches the discharging position, the control unit 200 discharges the grease G more from the dispenser 30 than the discharging amount to the convex area 5A. The control unit 200 adjusts the grease discharging amount by changing the grease discharging speed of the dispenser 30. That is, the control unit 200 decreases the rotating speed of the rotor of the mono pump in the convex area 5A, thereby setting the grease discharging speed low. Also, the control unit 200) increases the rotating speed of the rotor of the mono pump in the concave area 5B, thereby setting the grease discharging speed high.

Figure 9:
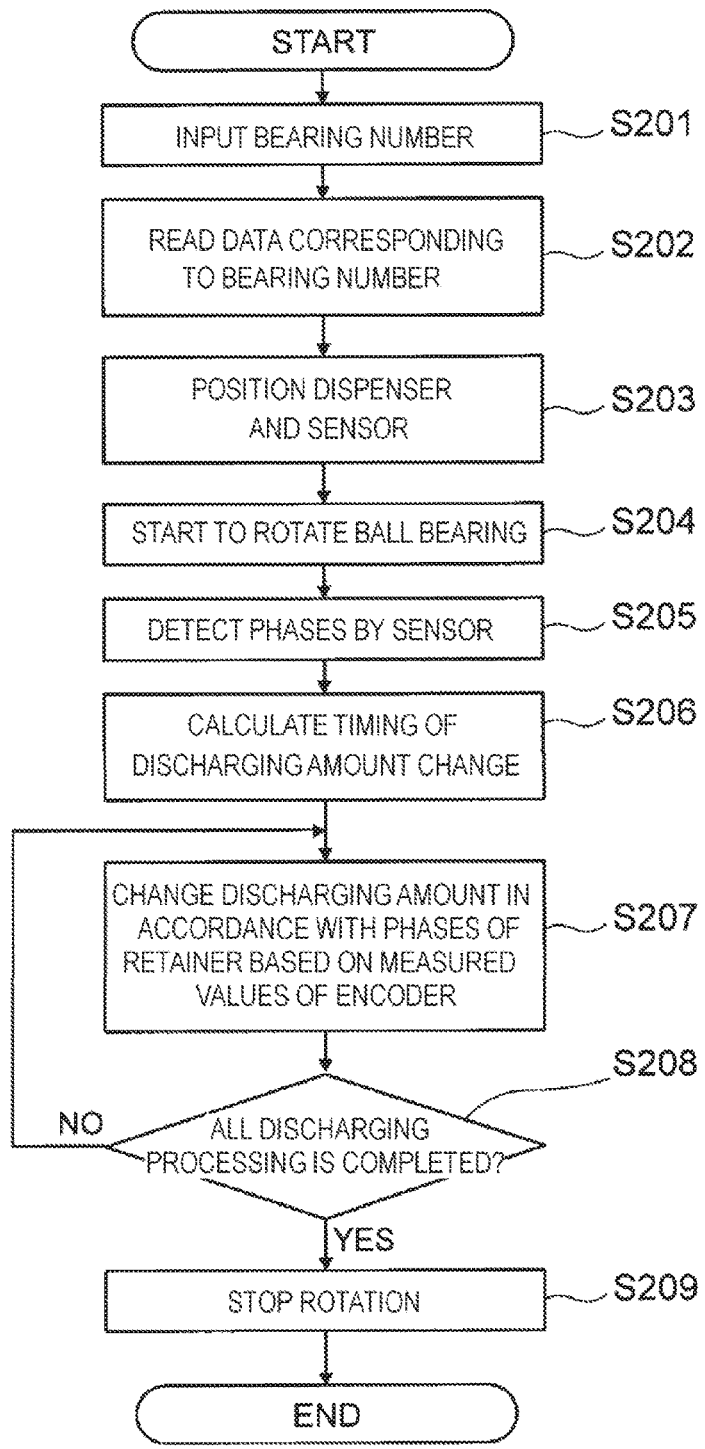
FIG. 9 is a flowchart showing the second grease sealing sequence.

In the below, the second grease sealing sequence is described with reference to a flowchart of FIG. 9. Since steps of S201 to S205 in this sequence are the same as steps of S101 to S105 shown in FIG. 5, the descriptions thereof are omitted.

After detecting the phases of the convex areas 5A and the concave areas 5B of the retainer 5 (S205), the control unit 200 calculates the timings of changing the discharging amount, based on the detection data of the laser sensor 40 (S206). The timings of changing the discharging amount are calculated by setting an increase/decrease schedule of the grease discharging amount associated with the rotation angle positions of the rotation frame 15. The increase/decrease schedule is a schedule of the discharging amount control of setting the grease discharging speed high when the concave area 5B of the retainer 5 reaches the grease discharging position and setting the grease discharging speed low when the convex area 5A of the retainer 5 reaches the grease discharging position in association with the rotation angle positions of the rotation frame 15.

Then, the control unit 200 changes the discharging amount in accordance with the phases of the convex areas 5A and the concave areas 5B of the retainer 5 based on the detection data from the encoder 18 while rotationally driving the rotation frame 15 (S207). That is, while the rotation frame 15 is rotationally driven, the grease is continuously discharged from the discharging nozzle 32 of the dispenser 30. Thereby, the grease is supplied over the entire circumference of the retainer 5. In this case, the grease discharging amount from the discharging nozzle 32 is smaller in the convex area 5A of the retainer 5 shown in FIG. 8A and is larger in the concave area 5B of the retainer 5 shown in FIG. 8B.

The control unit 200 continues the processing of S207 based on the detection data from the encoder 18 until the retainer 5 completes one rotation cycle (S208). The control unit 200 stops the rotation of the rotation frame 15 when it is confirmed that the discharging corresponding to one rotation cycle of the retainer 5 is completed (S209). Then, the control unit 200 retreats upwards the dispenser 30 and carries the ball bearing 1 to another place, thereby ending the grease sealing processing for one ball bearing 1.

<Operational Effects of Second Grease Sealing Sequence>

According to the second grease sealing sequence, the grease is continuously supplied while changing the grease discharging amount by the dispenser 30 in conformity to the phases of the convex areas 5A and the concave areas 5B of the retainer 5, without stopping the rotation of the ball bearing 1. For this reason, it is possible to further shorten the cycle time of the grease sealing for the ball bearing.

Also, since the appropriate amount of the grease is sealed in accordance with the unevenness irrespective of the difference between the phases of the convex areas 5A and the concave areas 5B, it is possible to smooth the grease surface of the retainer 5. Therefore, it is possible to solve the concerns that the grease is to be attached to the backside of a seal or shield to be mounted to the bearing after the grease sealing, the grease is to stick out to the outside of the bearing when pressing the seal or shield into an attachment groove, and the like.

The ball bearing produced by the grease sealing method for the ball bearing is a product of high grade and high performance where the threading problem and the variation in the grease sealing amount are not caused.

The present invention is not limited to the embodiments, and combinations of the respective configurations of the embodiments and changes and modifications made by one skilled in the art based on the specification and the well-known technology are also included within the scope of the present invention to be protected.

For example, the grease may be sealed by rotating the dispenser 30 relative to the ball bearing 1 and the ball bearing 1 may move up and down, instead of the lifting operation of the dispenser 30. That is, the moving structure is not particularly limited as long as the dispenser 30 and the ball bearing 1 can move relative to each other.

The present invention is based on a Japanese Patent Application No. 2014-186215 filed on Sep. 12, 2014, the content of which is herein incorporated by reference.

DESCRIPTION OF REFERENCE NUMERALS

1: ball bearing
2: outer ring
3: inner ring
4: ball
5: retainer
5A: convex area
5B: concave area
5C: pocket
7: annular space
10: grease sealing device
15: rotation frame (rotation driving unit)
17: motor (rotation driving unit)
18: encoder (sensor)
22: front-rear actuator (radial driving unit)
24: lifting actuator (lifting driving unit)
30: dispenser
32: discharging nozzle (discharge port)
40: laser sensor (sensor)
200: control unit (discharging adjusting unit)
E1: ball pitch circle
G: grease

The invention claimed is:

1. A grease sealing method for a ball bearing which includes an inner ring, an outer ring, a plurality of balls, and a retainer arranged in an annular space between the inner ring and the outer ring and accommodates the plurality of balls in pockets provided at intervals in a circumferential direction and for sealing grease in the annular space, the method comprising:
   rotationally driving the retainer about an axis of the ball bearing;
   detecting a detected area corresponding to one of a convex area where the pockets are provided along a ball pitch circle of the retainer or a concave area provided between the adjacent pockets to provide a detection result; and
   discharging grease by a dispenser including a single grease discharge port arranged to face the annular space based the detection result,
   wherein the dispenser continuously discharges the grease over an entire circumference of the retainer, and
   wherein a grease discharging amount from the dispenser is changed according to the detected area.

2. The grease sealing method according to claim 1, wherein an axial height of a side surface of the retainer which is rotationally driven is detected, and the detected area is determined based on the detected axial height.

3. The grease sealing method according to claim 1, wherein the retainer and the grease discharge port are moved relatively close to or separated from each other according to a timing of discharging the grease from the discharge port of the dispenser.

4. The grease sealing method according to claim 3, wherein the grease discharge port of the dispenser is moved closer to the concave area at a timing when the concave area of the retainer reaches a position facing the grease discharge port of the dispenser.

5. The grease sealing method according to claim 1, wherein the grease discharging amount from the grease discharge port of the dispenser is made larger when the concave area of the retainer faces the grease discharge port than when the convex area of the retainer faces the grease discharge port.

6. The grease sealing method according to claim 1, wherein the grease is suctioned after discharging the grease.

7. The grease sealing method according to claim 1, wherein the ball bearing is a deep groove ball bearing having 13 or more balls.

8. The grease sealing method according to claim 1, wherein the ball bearing is a deep groove ball bearing having 20 or more balls.

* * * * *